United States Patent [19]

Abe

[11] Patent Number: 4,861,633
[45] Date of Patent: Aug. 29, 1989

[54] CYLINDRICAL FILTER

[75] Inventor: Morio Abe, Shiga, Japan

[73] Assignee: Chisso Corporation, Ohsaka, Japan

[21] Appl. No.: 196,380

[22] Filed: May 19, 1988

[30] Foreign Application Priority Data

May 19, 1987 [JP] Japan ................... 62-122050

[51] Int. Cl.$^4$ ............................... D04H 1/04
[52] U.S. Cl. .................... 428/36.3; 57/905; 57/908; 156/167; 264/103; 428/221; 428/222; 428/296; 428/299; 428/373
[58] Field of Search ............. 428/36, 221, 296, 299, 428/373, 222; 156/167, 180; 264/103; 57/905, 908

[56] References Cited

U.S. PATENT DOCUMENTS

| 4,269,888 | 5/1981 | Ejima et al. | 156/167 |
| 4,542,060 | 9/1985 | Yoshida et al. | 428/299 |
| 4,551,378 | 11/1985 | Carey | 428/296 |
| 4,770,925 | 9/1988 | Uchikawa et al. | 428/296 |
| 4,772,347 | 9/1988 | Fowler | 156/167 |

FOREIGN PATENT DOCUMENTS 62-183818  8/1987  Japan .
62-269721 11/1987  Japan .

OTHER PUBLICATIONS

English abstract of Japanese Appln. 62183818 provided by Derwent.
English abstract of Japanese Appln. 62269721 provided by Derwent.

Primary Examiner—James J. Bell
Attorney, Agent, or Firm—Fay, Sharpe, Beall, Fagan, Minnich & McKee

[57] ABSTRACT

A superior cylindrical filter having a long filtration life is provided, which filter is obtained by using interlaced filaments comprising 20% by weight or more of hot-melt-adhesive composite filaments composed of plurality of components having a melting point difference of 20° C. or more and having two or more interlaced portions per meter of which the interlacing strength is $15 \times D$ mg or more, wound up on a core material in a cylindrical form under a tension of $15 \times D$ mg or less, the contact points of the interlaced filaments being bonded by melt-adhesion of the low melting component of the composite filaments.

7 Claims, 2 Drawing Sheets the amount of cake caught and the pressure drop.

CYLINDRICAL FILTER

BACKGROUND OF THE INVENTION

This invention relates to a cylindrical filter having a novel structure.

As to currently commercially available cylindrical filters, various kinds have been known such as those obtained by winding a cloth or a non-woven fabric in the form of rolls, followed by adhering the resulting rolls by heat or with a resin, those obtained by winding a fiber bundle of cotton yarns, multifilaments, etc. on a core material such as a perforated cylinder, etc., hereinafter referred to as a winding-type filters, and among these, those using multifilaments have been used in many cases in the aspect of convenience of production process.

In the case of the winding type filters, in order to impart a required mechanical strength thereto, the fiber bundle should be wound up under a certain tension so that it is difficult to obtain those having a broad void between fibers. Particularly in the case where the fiber bundle is of multifilaments, since the respective single filaments constituting the multifilaments are made parallel, not only the void between single filaments but also that between the fiber bundles are liable to become narrow. Thus, when filters produced from such a fiber bundle are used, there is a drawback that solid matters are liable to be caught only at parts close to the surface so that resistance to water pass rises in a relatively short time, that is, the so-called filtration life is short. In order to avoid such a drawback, it may be possible to make the outer layer of filters rougher and make the inner layer thereof denser, by means of, e.g., winding up the fiber bundle gradually or stepwisely reducing the tension from the beginning of the winding toward the end thereof, or using coarse fibers on the outer layer of filters, but there is another drawback that the steps are complicated.

SUMMARY OF THE INVENTION

The present inventors have done extensive research in order to overcome the above-mentioned drawbacks of the winding-type filter and obtain a filter having a long filtration life, and as a result have achieved the present invention.

The present invention resides in a cylindrical filter having interlaced filaments comprising 20% by weight or more of hot-melt adhesive composite filaments composed of a plurality of components having a melting point difference of 20° C. or more there-between and having two or more interlaced portions per meter of said interlaced filaments of which portion the interlacing strength is 15×D mg or more, wound up on a core material in cylindrical form under a tension of 15×D mg or less, where D equals the total denier of the interlaced filaments, the contact points of said interlaced filaments being bonded by melt-adhesion of the low melting point component of said composite filaments.

DETAILED DESCRIPTION OF PREFERRED EMBODIMENT

Figure 1:
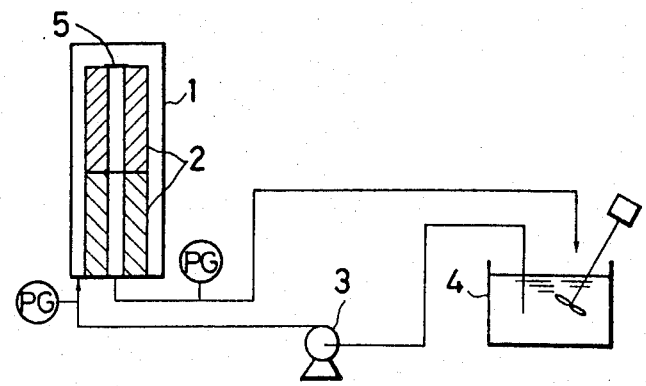
FIG. 1 shows a conceptional view of an apparatus for filtration test.

The hot-melt adhesive composite filaments used in the present invention are defined as composite filaments having a plurality of components having a melting point difference of 20° C. or more, preferably 25° C. or more therebetween, arranged into those of side-by-side type, sheath-and-core type or island-in-sea type so that the low melting point component of the composite filaments can be present on the surface thereof. In the case where said melting point difference is less than 20° C., an allowable temperature range for the heat treatment of the filter is narrow. As to the raw materials for such composite filaments, examples of the high melting component thereof are polyesters, polyamides, polypropylene, polyvinyl chloride, etc., and examples of the low melting component are low melting polyesters, low melting polyamides, low melting polypropylene, various polyethylenes, ethylene-vinylacetate copolymer, etc. are shown. Raw materials used for the composite filaments, combinations thereof, deniers thereof and other conditions may be adequately chosen depending on the use of the filter (water permeability, heat resistance, pressure resistance, etc.). As for a single filament of the composite filaments, that having a denier of about 1.0 to 100 deniers is preferably used.

The hot-melt adhesive composite filaments may be used by themselves singly as multifilaments, but they may also be used in the form of mixture thereof with other kinds of filaments having said composite filaments contained therein in 20% by weight or more. Such other kinds of filaments refer to filaments of, e.g., polyesters, polyamides, polyolefins, etc., having a melting point higher than that of the low melting point component of the composite filaments. In the case where the multifilaments have crimps, the resulting filter has large voids between filaments, hence such multi-filaments are preferred. The crimps may be either spontaneous crimps or two or three-dimensional crimps which have been given by a stuffing box and the like.

In the case where interlaced filaments comprise less than 20% by weight of the hot-melt adhesive composite filaments, the bonded points on the filaments are decreased to be a risk of losing the strength of the filter obtained. A preferable content of the hot-melt adhesive composite filaments is 30% by weight or more.

In the present invention, the above-mentioned multifilaments are used in the form of interlaced filaments having two or more interlaced portions per meter of the interlaced filaments having an interlacing strength of 15×D mg or more, preferably 20×D mg or more, where D equals the total denier of the interlaced filaments. Herein, the number of the above-mentioned interlaced portions is given by applying an initial load of 15×D mg to a sample of 1 m long, then, after one minute, attaching thereon two gage marks at a 50 cm interval, removing the load, measuring the number of interlaced portions still present after the removal, repeating the above procedure with five samples and calculating the average value of the samples. In general, interlaced filaments having a total denier D of 50 to 10,000 are preferred.

If said strength of the interlaced portion is less than 15D, when the interlaced filaments are wound up in a cylindrical shape, the interlaced portions thereof are unlaced to be arranged in parallel, thereby causing a drawback that the voids in the filter layer are decreased.

The means for imparting the interlaced portions to the multi-filaments has no particular limitation, and a conventional interlacing apparatus using a high pressure gas at room temperature or high temperatures may be employed. The interlaced filaments may be wound up under a tension of 15×D mg or less so as to give a desired thickness. If the winding-up tension exceeds 15×D mg, the interlaced portions are opened; hence such excess is undesirable. When the core used for the winding-up is a non-porous tube or a rod, it is drawn out after forming the filter, but when it is a porous tube, it may be left in the filter.

The heat treatment for bonding the contact points of filaments is carried out by heating the interlaced filaments to a temperature between the melting points of the composite components of the composite filaments. This heat treatment may be carried out at the same time with the winding-up step or after said step. In the case where the heat treatment is carried out at the same time with the winding-up step, a process of winding up interlaced filaments having passed through a heating chamber, a process of heating the surface of the cylindrical material during winding-up, etc. are chosen. As the heat source therefor, infrared rays, high temperature gases, etc. may be used. When heating is carried out after the winding-up step, a process of passing high temperature gases through the cylindrical material from its outside toward its inside may be employed.

The interlaced filaments are constricted and thinned in the interlaced portions. In the present invention, the interlaced filaments are wound up in a state where the interlaced portions are not opened to form a filter, and voids corresponding to the interlaced portions are left behind over the whole of the filter layer; hence the resulting filter not only has a small pressure loss, but also cakes as described later are caught even at the inner portions of the filter layers so that the increase in the pressure due to catching of cakes is small and the filtration life becomes long. Further, since the filter of the present invention has been adhered between filaments by the low melting point component of the hot-melt composite filaments, the contact points are small and homogeneously dispersed over the whole of the filter and hence the void ratio and strength of the resulting filter are both high.

The present invention will be described in more detail by way of examples and comparative examples. In addition, the measurements of the amount of cake caught, the pressure loss and the filtration accuracy employed in these examples were carried out according to the following methods:

Amount of Cake Caught and Pressure Loss

As shown in FIG. 1, two filters 2 are laid one on the other and fixed with a cover 5 in a housing 1, followed by measuring the pressure difference (pressure loss) between the inlet and exit of the filters while circulating water (35 l/min.) by means of a pump 3, successively adding a cake solution (20 ml; cake amount 2 g) into a water vessel 4, measuring the pressure loss when water in the water vessel has been clarified, and repeating the addition of the cake solution and the measurement of the pressure loss while continuing the circulating filtration to determine the amount of cake (added amount of cake caught) and the value of the pressure loss. The cake solution used is a suspension containing 10% by weight of a mixed powder consisting of 25% by weight of an activated carbon (Shirasagi C (tradename), content of particles having particle sizes of 43 μm or less: 80% by weight), 50% by weight of abrasive powder (FO #1200 (tradename), content of particles having particle sizes of 5 to 15 μm: 90% by weight and 25% by weight of carborundum (#200, content of particles having particles size of 35 to 110 μm : 90% by weight).

Filtration Accuracy

Figure 2:
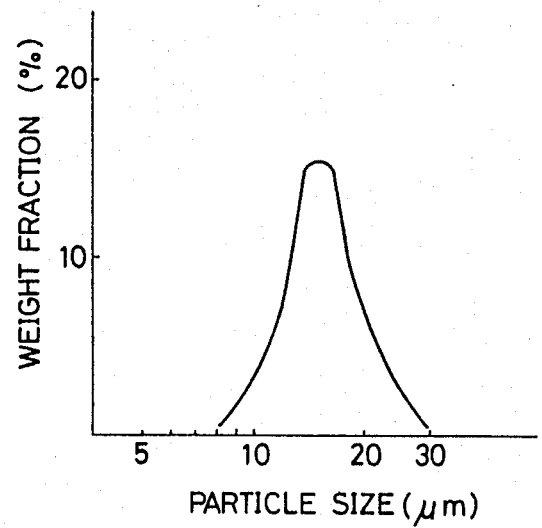
FIG. 2 shows a particle size distribution of carborundum #600.

Employing the same apparatus as shown in FIG. 1, one filter 2 is fixed with a cover 5 in the housing, followed by circulating water at a flow rate of 50 l/min., adding 20 g of a cake (carborundum #600) into the water vessel, sampling filtered water (100 ml) two minutes after addition of the cake, filtering it by means of a membrane filter capable of catching particles having particle sizes of 1 μm or more, measuring the particle size of the cake caught on the membrane filter by means of an apparatus for measuring the particle size distribution of the cake particles, and calculating the catching efficiency of each particle size based on the particle size distribution of the raw material. The minimum particle size in which the catching efficiency is 75% or higher is defined as the filtration accuracy. The particle size distribution of the carborundum (#600) is shown in FIG. 2.

EXAMPLES 1 TO 3 AND COMPARATIVE EXAMPLE 1

A polyester as a core component and a high density polyethylene as a sheath component were subjected to composite melt-spinning in a composite ratio of 50/50, followed by imparting three-dimensional crimps to the resulting hot-melt adhesion composite filaments to obtain multifilaments (the denier of a single filament: 2.8 deniers, the number of filaments: 700 and the total denier: 1,960 deniers) consisting of the composite filaments, and subjecting the multifilaments to interlacing processing by means of an interlacer of high pressure air ejection type to obtain various interlaced filaments.

The interlaced filaments drawn from a creel were passed through a hot air-circulating heating chamber at 130° C. and then a far infrared rays heating chamber for heat-treatments followed by successively winding them up on a stainless steel pipe of 30 mm in diameter over a length of 300 mm, winding one over another up to an outer diameter of 70 mm under the tension of (1960×14 mg), approximately 27 g, allowing the resulting material to cool down after completion of the winding-up, drawing out the stainless steel pipe and cutting off both the end parts of the material to obtain a cylindrical filter having a length of 250 mm, an outer diameter of 70 mm, an inner diameter of 30 mm, and a packing density of 0.28 to 0.29 g/cm³. The filterabilities of these filters evaluated are shown in Table 1 and FIG. 3.

TABLE 1

Figure 3:
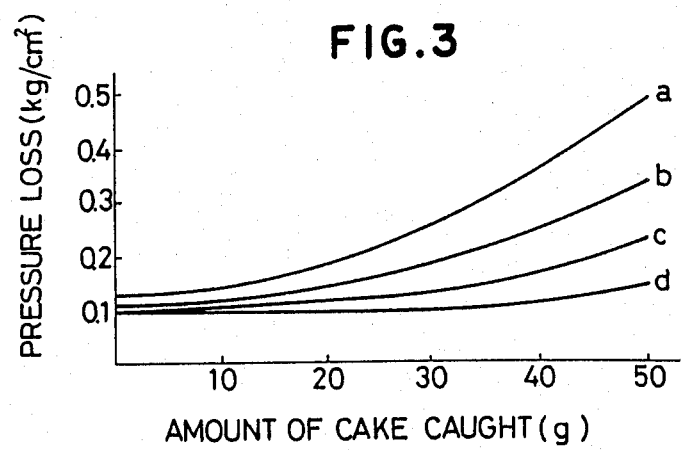
FIGS. 3 to 5 each show a relationship between the amount of cake caught and the pressure drop.

|  | Interlaced Portion/m | Packing density (g/cm2) | Filtration accuracy (μm) | Initial pressure loss (kg/cm2) | Symbol in FIG.3 |
|---|---|---|---|---|---|
| Comp. Ex. 1 | 0 | 0.293 | 5 | 0.13 | a |
| Example 1 | 2 | 0.288 | 5 | 0.11 | b |

TABLE 1-continued

| | Interlaced Portion/m | Packing density (g/cm$_2$) | Filtration accuracy (μm) | Initial pressure loss (kg/cm$_2$) | Symbol in FIG.3 |
|---|---|---|---|---|---|
| Example 2 | 18 | 0.282 | 5 | 0.10 | c |
| Example 3 | 47 | 0.283 | 5 | 0.10 | d |

EXAMPLES 4 TO 6 AND COMPARATIVE EXAMPLE 2

Figure 4:
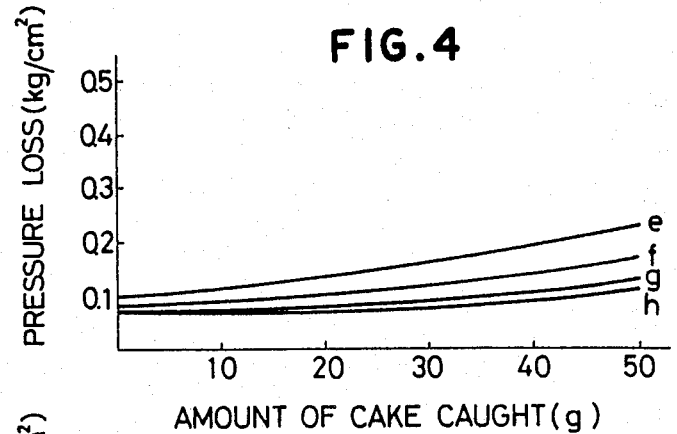

Various filters were produced in the same manner as in Examples 1 to 3 except that a polypropylene and a high density polyethylene were subjected to composite-melt-spinning in a composite ration of 50/50 in side-by-side manner, followed by imparting three-dimensional crimps to the resulting hot-melt-adhesive composite filaments and the resulting multifilaments consisting of the filaments (the denier of single filament: 17.9 deniers the number of filaments: 120, and the total denier of the multifilament: 2148 deniers were wound under the tension of (2148×14.5) mg, approximately 31 g, the filterabilities of these filters evaluated are shown in Table 2 and FIG. 4.

TABLE 2

| | Interlaced Portion/m | Packing density (g/cm$_2$) | Filtration accuracy (μm) | Initial pressure loss (kg/cm$_2$) | Symbol in FIG.4 |
|---|---|---|---|---|---|
| Comp. Ex. 2 | 0 | 0.301 | 40 | 0.09 | e |
| Example 4 | 3 | 0.294 | 40 | 0.08 | f |
| Example 5 | 19 | 0.296 | 40 | 0.07 | g |
| Example 6 | 28 | 0.293 | 40 | 0.07 | h |

EXAMPLES 7 AND 8 AND COMPARATIVE EXAMPLE 3

Various filters were obtained in the same manner as in Example 1 to 3 except that a polypropylene and a high density polyethylene were subjected to composite-melt-spinning in a composite ratio of 50/50 in side-by-side manner, followed by imparting three-dimensional crimps to the resulting hot-melt-adhesive composite filaments to obtain multifilaments consisting of said filaments (the denier of single filament: 2.5 deniers the number of filaments: 350 and the total denier of the multifilament: 875 deniers) and mixing and paralleling the thus obtained multifilaments and polypropylene multifilaments having three-dimensional crimp (the denier of single filament: 3.5 deniers, the number of filaments: 240 and the total denier of the multifilaments: 840 deniers at a mixing ratio of 50/50, and the resulting mixed multifilaments were wound under the tension of (1715×14.5) mg, approximately 25 g. The filterabilities of these filters evaluated are shown in Table 3 and FIG. 5.

Figure 5:
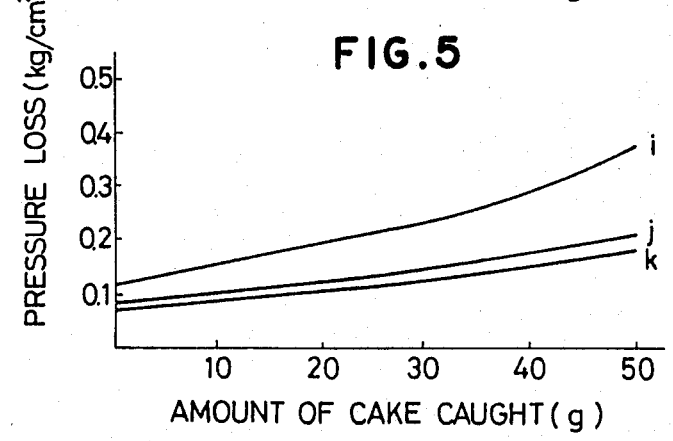

As is apparent from Table 1 to 3 and FIGS. 3 to 5, the cylindrical filter of the present invention is a superior filter having a long filtration life.

What I claim is:

1. A cylindrical filter composed of interlaced filaments comprising 20% by weight or more of hot-melt adhesive composite filaments composed of a plurality of components having a melting point difference of 20° C. or more therebetween and having two or more interlaced portions per meter of said interlaced filaments of which portions the interlacing strength is 15×D mg or more, wound up on a central core material in cylindrical form under a tension of 15×D mg or less, where D equals the total denier of said interlaced filaments, the contact points of said interlaced filaments being bonded by melt-adhesion of the low melting component of said composite filaments to integrate said interlaced filaments.

2. A cylindrical filter according to claim 1 wherein said interlaced filaments are used only on the outer layer of said filter.

3. A cylindrical filter according to claim 1 wherein said hot-melt-adhesive composite filaments are two- or three-dimensional crimped filaments.

4. A cylindrical filter according to claim 1 wherein said interlaced filaments comprise 30 to 100% by weight of hot-melt adhesive composite filaments.

5. A cylindrical filter according to claim 1 wherein the strength of the interlaced filaments is 20D (mg) or higher.

6. A cylindrical filter according to claim 1 wherein said hot-melt adhesive composite filament is composed of sheath-and-core, side-by-side or island-in-sea components.

7. A cylindrical filter according to claim 6 wherein said components consist of a high melting point component which is selected form polyester, polyamide, polypropylene and polyvinylchloride and a low melting point component which is selected from low melting polyester, low melting polyamide, low melting polypropylene, polyethylene and ethylene-vinylacetate copolymer.

* * * * *

TABLE 3

| | Interlaced Portion/m | Packing density (g/cm$_2$) | Filtration accuracy (μm) | Initial pressure loss (kg/cm$_2$) | Symbol in FIG.5 |
|---|---|---|---|---|---|
| Comp. Ex. 3 | 0 | 0.290 | 10 | 0.12 | i |
| Example 7 | 14 | 0.284 | 10 | 0.09 | j |
| Example 8 | 52 | 0.282 | 10 | 0.08 | k |